Patented Sept. 27, 1949

2,483,158

UNITED STATES PATENT OFFICE 2,483,158

LIQUID ORGANO-SUBSTITUTED POLYSILOXANES

Murray M. Sprung, Scotia, N. Y., and Donald F. Wilcock, Saugus, Mass., assignors to General Electric Company, a corporation of New York No Drawing. Application October 11, 1946, Serial No. 702,590

3 Claims. (Cl. 260—448.2)

This invention relates to new and useful synthetic, non-resinous liquid compositions and methods of making the same. More particularly, the invention is concerned with fluid or oily (non-resinous) compositions comprising a liquid linear polysiloxane containing the structural units

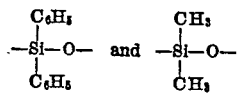

in the linear chain and having terminal silicon atoms to each of which are attached three hydrocarbon groups, e. g., three methyl groups, three phenyl groups, two methyl and one phenyl group, etc. The liquid linear polysiloxanes embraced by our claimed invention can also be defined as corresponding to the general formula

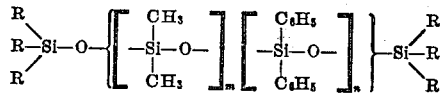

where R is a monovalent hydrocarbon radical (for example, alkyl, for instance, methyl, ethyl, propyl, etc.; aryl, for instance, phenyl, etc.; aralkyl, for instance, benzyl, phenylethyl, etc.; alkaryl, for instance, tolyl, ethylphenyl, xylyl, etc.) and $m$ and $n$ are each integers equal to at least 1. Preferably, R is the methyl radical.

It was known prior to our invention that there could be produced linear polysiloxanes corresponding to the general formula I 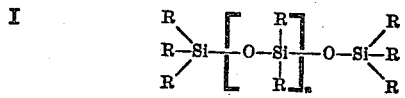

in which the various R's represent the same or different lower monovalent hydrocarbon radicals, more particularly, hydrocarbon radicals selected from the class consisting of lower alkyl, aryl, alkaryl, and aralkyl radicals, and $n$ is an integer equal to at least 1. Such linear polysiloxanes and methods of preparation are more fully described and claimed in the copending application of Winton I. Patnode, Serial No. 463,814, filed October 29, 1942, now Patent 2,469,858 and assigned to the same assignee as the present invention.

We have now discovered that liquid organopolysiloxanes containing the two structural units

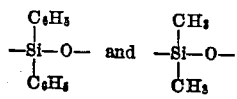

in the chain and having terminal silicon atoms, to each of which are attached three hydrocarbon groups, when employed as lubricants in certain applications have greatly improved properties over other liquid polysiloxanes, e. g., liquid methyl polysiloxanes, employed for the same purpose. The liquid polysiloxanes employed in the practice of our invention have an average of slightly more than two hydrocarbon, i. e., methyl and phenyl, groups per silicon atom, e. g., an average of from about 2.001 to 2.5 methyl and phenyl groups per silicon atom.

The positions of the two aforementioned structural units in the linear polysiloxane are not exactly determined. One or more of the same structural units may be adjacent to each other, or it is quite possible that for certain lengths of the chain there may occur regular alternations of the dimethylsiloxy and diphenylsiloxy units. Whichever final structure may exist in the linear polysiloxane, both aforementioned units are present in the chain simultaneously. Also, it has not been determined clearly which of the aforementioned structural units are closest to the terminal silicon atoms. Thus in one combination, assuming the presence of terminal trimethyl silyl groups, it is possible to have either a dimethylsiloxy or a diphenylsiloxy unit immediately adjacent to each of the two terminal silicon atoms to give the following general formulae:

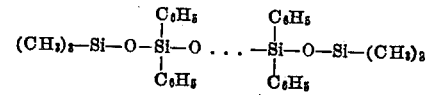

or

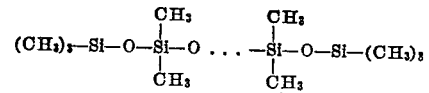

It is also possible to have one dimethylsiloxy and one diphenylsiloxy unit adjacent to each of the two terminal silicon atoms, respectively, as illustrated by the following general formula:

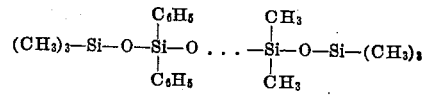

Regardless of the actual structure, the final product comprises a mixture of liquid linear polysiloxanes wherein the distribution of the structural units is one of generally random distribution depending upon such factors as, for instance, proportions of ingredients employed in the preparation of the liquid polysiloxanes, hydrolysis conditions, etc.

The fluid compositions of this invention may be used alone or admixed with other liquid materials, for example, with fluid bodies of the kind disclosed in the aforementioned Patnode application, as electrically insulating fluids, hydraulic fluids, damping fluids, lubricants, etc. For instance, they may be admixed with (1) a liquid methylpolysiloxane corresponding to the formula $[(CH_3)_2SiO]_x$, where $x$ is a whole number and is greater than 10; or with (2) a liquid mixture of organopolysiloxanes corresponding to the general Formula I; or with both (1) and (2). These new compositions also may be admixed with other materials, e.g., metallic soaps, etc., to form greases.

From the foregoing description, it will be seen that the present invention provides liquid or fluid compositions which are suitable for use as lubricants and for other purposes, comprising an oily mixture of linear polysiloxanes, at least some of which comprise a liquid linear polysiloxane containing the structural units

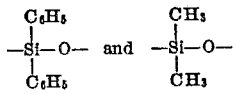

in the linear chain and having terminal silicon atoms to each of which are attached three hydrocarbon groups, preferably three methyl groups, the said oily material containing a plurality of different linear compounds embraced by the above description of their structure. Liquid materials composed of a plurality of different linear liquid polysiloxanes corresponding to the above description may be prepared which are substantially non-volatile at a temperature of the order of 150° C. at atmospheric pressure, and, in addition, their lubricating properties are substantially better than the lubricating properties of other liquid polysiloxanes, e. g., liquid linear methyl polysiloxanes. Of particular interest and value are fluid or oily compositions comprising a preponderant proportion, for example, from 55 to 99 per cent or more, by, weight, of the composition, of different liquid linear polysiloxanes, the individual members of which correspond to the general description set forth in the first paragraph of this specification.

Various methods may be employed for preparing the liquid compositions embraced by the statement of our invention. One suitable method of preparing such compositions comprises effecting an interchange or equilibrium reaction between (1) the product of hydrolysis of a mixture of halogenosilanes comprising, for example, about 80 to 99 mol per cent dimethyl dichlorosilane and approximately 20 to 1 mol per cent diphenyl dichlorosilane and (2) the product of hydrolysis of a halogenosilane corresponding to the general formula $(CH_3)_3SiX$ where X is a halogen, for example, chlorine, bromine, etc.

A more specific embodiment of the method features of our invention comprises hydrolyzing a mixture of halogenosilanes comprising, for instance, trimethyl chlorosilane (or trimethyl bromosilane), dimethyl dichlorosilane (or dimethyl dibromosilane) and diphenyl dichlorosilane (or diphenyl dibromosilane), the said dihalogenosilanes being present in the said mixture in the ratio of about 1 mol of the trimethyl halogenosilane to at least 1 mol, usually at least 2 mols (for example, from 3 to 199 or more mols) of the total mols of dihalogenosilanes, and effecting a condensation reaction between the resulting mixed products of hydrolysis until there has been obtained a liquid or oily mixture of liquid linear polysiloxanes at least a preponderant number of which contain the structural units

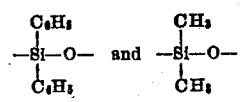

in the linear chain and have terminal silicon atoms to each of which are attached, in this case, three methyl groups. The liquid or oily mixture contains a plurality of different linear compounds embraced by the above description.

Another method by which the fluid compositions represented by the aforementioned description may be prepared comprises (1) mixing together (a) a composition corresponding to the general formula

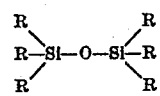

where R is a hydrocarbon radical, an example of such a composition being hexamethyl disiloxane, and (b) a product of hydrolysis of a mixture of chlorosilanes comprising, for example, dimethyl dichlorosilane and diphenyl dichlorosilane, (2) cleaving silicon-oxygen linkages of the ingredients of (a) and (b), (3) forming silanol derivates of the cleaved products and (4) effecting a condensation reaction between the said silanol derivatives, the steps of (2), (3) and (4) being carried out substantially concomitantly or simultaneously. Instead of using the entire product of hydrolysis of the dihalogenosilanes, we may employ, for example, a previously isolated product of hydrolysis of a mixture of halogenosilanes comprising a diphenyl dihalogenosilane and a dimethyl dihalogenosilane.

Sulfuric acid is a suitable agent for use in effecting the simultaneous or consecutive reactions set forth under steps (2), (3) and (4) above. This method is more fully described in the co-pending application of Robert O. Sauer, Serial No. 656,163, filed March 21, 1946, and assigned to the same assignee as the present invention, and in the aforementioned Patnode application, Serial No. 463,814. Although other acids, for instance, hydrochloric acid, phosphoric acid, etc., may also be used for this purpose, sulfuric acid is preferred. Wherever such agents are employed, it is usually desirable and preferable to remove them later from the reaction mass by suitable means, for example, by washing with water.

An additional method of preparing liquid linear polysiloxanes corresponding to the general description above comprises effecting rearrangement by the process of cleavage and condensation referred to above of a mixture comprising (a) the hydrolysis product of a dimethyl dihalogenosilane, (b) diphenylsilanediol, the hydrolysis product of a diphenyl dihalogenosilane and (c) hexamethyl disiloxane, said rearrangement being effected in the presence of an acid, e. g., sulfuric acid.

Another method for preparing the liquid linear polysiloxanes embraced by our invention comprises dissolving, for example, dimethyl dichlorosilane and diphenyl dichlorosilane, in an aromatic hydrocarbon solvent, for example, toluene, etc., and hydrolyzing the mixture of chlorosilanes by adding it to another mixture comprising (1) water in an amount in excess of that calculated as necessary to hydrolyze all the chlorosilanes, (2) a saturated aliphatic alcohol containing from 4 to 8 carbon atoms, preferably tertiary saturated aliphatic alcohols, for example, tertiary butyl alcohol, tertiary amyl alcohol, etc., and (3) an additional amount of an aromatic hydrocarbon as, for example, toluene. The hydrolysis product is preferably washed with water several times and the residual acid and solvent are removed by distillation. Thereafter, the liquid polysiloxane product (comprising a mixture of cyclopolysiloxanes and linear polysiloxanes) is shaken with hexamethyl disiloxane in the presence of an acidic rearrangement catalyst, for example, sulfuric acid. The liquid composition comprising a mixture of linear liquid polysiloxanes thereby obtained is washed with water to remove the last traces of the acidic rearrangement catalyst, to yield an oily mixture of liquid linear polysiloxanes, some of which correspond to the general formula

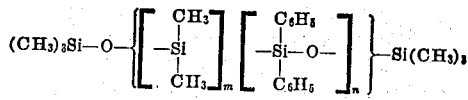

where $m$ and $n$ are each integers equal to at least 1 and as high as 300 to 500 or more. For additional directions as to the aforementioned rearrangement and hydrolysis reactions, reference may be had to the aforementioned Patnode application and to another Patnode application, Serial No. 463,815, now abandoned, filed concurrently with the former Patnode application and assigned to the same assignee.

In order that those skilled in the art may better understand how the present invention may be practiced, the following examples are given by way of illustration and not by way of limitation. All parts and per cents are by weight.

Example 1

A mixture of chlorosilanes was prepared by dissolving 40.5 parts diphenyl dichlorosilane and 186 parts dimethyl dichlorosilane in 40 parts toluene. This mixture was hydrolyzed by running it slowly into another mixture comprising 800 parts water, 80 parts tertiary amyl alcohol and 40 parts toluene. The oily hydrolysis phase which appeared was separated from the liquid phase and washed three times with water. The residual solvent and water were removed from the liquid polysiloxane by distillation through a Vigreux column until a vapor temperature of about 150° C. was reached. About 33.2 parts of the liquid residue and 2.5 parts of hexamethyl disiloxane were shaken together with about 1.9 parts concentrated sulfuric acid to effect the rearrangement discussed previously. The liquid linear polysiloxane containing the structural units

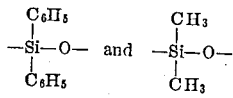

in the linear chain and having terminal silicon atoms bearing, in each case, three methyl groups, was washed thoroughly with water to remove the last traces of acid and thereafter dried over anhydrous potassium carbonate. The viscosity of the oily product at 100° F. was 29.7 centistokes and at 210° F. its viscosity was 10.1 centistokes.

A liquid methyl polysiloxane was now prepared by hydrolyzing a mixture comprising essentially dimethyl dichlorosilane and the hydrolysis product was thereafter coreacted with hexamethyl disiloxane in the presence of sulfuric acid and isolated and purified in accordance with the method disclosed in the aforementioned Patnode application Serial No. 463,814.

Each of the two above oils was employed as a lubricant in a high speed gyro bearing. The bearing was operated under usual conditions (about 12,000 revolutions per minute) until the oils showed signs of gelation. The liquid methyl polysiloxane showed signs of gelation when it had run from about 200 to 500 hours in the bearing, whereas the liquid linear polysiloxane prepared above and corresponding to the description embraced by our claimed invention did not show signs of gelation until after about 3,000 hours in the gyro bearing.

Example 2

A mixture of chlorosilanes was prepared by dissolving 25.3 parts (10 mol per cent) diphenyl dichlorosilane and 116.1 parts (90 mol per cent) dimethyl dichlorosilane in toluene. This mixture was hydrolyzed and the hydrolysis product separated in the same manner as employed in Example 1. About 24.7 parts of the liquid polysiloxane (from which all materials boiling below 150° C. had been removed) thereby obtained was shaken with approximately 5.2 parts of hexamethyl disiloxane in the presence of about 1.3 parts sulfuric acid. After shaking this mixture for about twenty-four hours to effect rearrangement of the siloxane units, it was washed with water several times and dried over anhydrous potassium carbonate. The viscosity of this liquid polysiloxane was 8.15 centistokes at 100° F. and 3.19 centistokes at 210° F.

Example 3

In this example approximately 5 mol per cent (about 7.5 parts) methyl trichlorosilane was cohydrolyzed with 95 mol per cent (about 122.5 parts) dimethyl dichlorosilane in the same manner as employed in Example 1. The cohydrolysis product was isolated, dried and all volatile matter boiling below 150° C. was removed in the same manner as was done in Example 1. Approximately 25 parts of the resulting material was mixed and shaken together with 7.4 parts diphenylsilanediol, 3.0 parts hexamethyl disiloxane and 3.5 parts concentrated sulfuric acid. After shaking this mixture for approximately twenty-four hours, it was separated and purified in the same manner as was employed in Example 1. The liquid linear polysiloxane thus obtained, which had a viscosity of 38.6 centistokes at 100° F. and 13.9 centistokes at 210° F., had the structural units

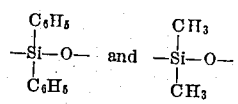

in the linear chain and had terminal silicon atoms to each of which were attached three methyl groups. The use of the trifunctional material (methyl trichlorosilane) also introduced a degree of branching of the linear polysiloxane chain.

Example 4

Approximately 25.1 parts of an isolated and purified composition comprising the product of hydrolysis of a mixture of ingredients containing 5 mol per cent (about 7.5 parts) methyl trichlorosilane and 95 mol per cent (about 122.5 parts) dimethyl dichlorosilane, was shaken together with 3.74 parts diphenylsilanediol, 4.0 parts hexamethyl disiloxane and 3.5 parts concentrated sulfuric acid. The liquid linear polysiloxane thus obtained was isolated and purified in the same manner as employed in Example 1 to yield an oily liquid linear polysiloxane having a structure similar to the one described in Example 3 and possessing good lubricating properties.

Example 5

About 25 parts of dimethylsiloxane tetramer having the formula $$[(CH_3)_2SiO]_4$$

was shaken for twenty-four hours with 7.4 parts diphenylsilanediol, 2.5 parts hexamethyl disiloxane and 5.0 parts concentrated sulfuric acid. The liquid linear polysiloxane obtained in this case was isolated and purified to yield an oily composition, showing good resistance to oxidation at elevated temperatures and showing outstanding lubricating properties.

Example 6

Approximately 1.1 parts 1-chlormethyl-1,3,3,5,5,7,7-heptamethyl cyclotetrasiloxane was thoroughly shaken for twenty-four hours with 0.7 part diphenylsilanediol, 24.0 parts dimethylsiloxane tetramer (see Example 5), 2.5 parts hexamethyl disiloxane and 2.0 parts concentrated sulfuric acid. The liquid linear polysiloxane thus obtained was isolated and purified in the same manner as employed in Example 1 to yield a liquid, linear, oily polysiloxane exhibiting good lubricating properties.

Although the proportion of the dimethyl dihalogenosilane and the diphenyl dihalogenosilane employed in some of the above examples may be varied over a wide range, it is desirable that the mixture of dihalogenosilanes comprise, for example, at least 80 mol per cent, e. g., 80 to 99 mol per cent, of the dimethyl dihalogenosilane and less than 20 mol per cent, e. g., 20 to 1 mol per cent of the diphenyl dihalogenosilane. The foregoing preferable ranges apply more particularly to cases where the dimethyl and diphenyl dihalogenosilanes are cohydrolyzed simultaneously.

The maintenance of the above-described proportions is desirable because if greater amounts of the diphenyl dihalogenosilane than disclosed above are employed in the hydrolysis operation, solid matter tends to separate out, thereby causing mechanical difficulties during subsequent phases in the preparation of the liquid polysiloxane. This is illustrated by the following table wherein dimethyl dichlorosilane and diphenyl dichlorosilane are hydrolyzed in water in the stated proportions:

| Dimethyl Dichloro-silane, Mols | Diphenyl Dichloro-silane, Mols | Product Obtained | |
|---|---|---|---|
| | | Oil, Grams | Solid, Grams |
| 1.9 | 0.1 | 136 | ------ |
| 1.8 | 0.2 | 144 | 8 |
| 1.6 | 0.4 | 140 | 30 |

It is feasible to add the precipitated solid matter to the isolated liquid hydrolysis product of the chlorosilanes (after removal of the water and the residual acid) and cause solution of the solid phase in the liquid phase by gently heating the mixture of the two phases, for instance, at about 50° to 100° C.

It will be apparent to those skilled in the art that these novel liquid polysiloxanes may be further modified by incorporating, for example, in the hydrolyzable mixture comprising the dimethyl dihalogenosilane and the diphenyl dihalogenosilane, other hydrocarbon-substituted halogenosilanes as, for example, methyl phenyl dichlorosilane, methyl ethyl dichlorosilane, methyl dichlorosilane ($CH_3SiHCL_2$), small amounts, e. g., from 1 to 5 mol per cent of methyl trichlorosilane (for purposes of introducing branching to the linear polysiloxane chain), etc. The incorporation of such modifying ingredients will modify somewhat the properties of the liquid linear polysiloxanes embraced by our claimed invention.

What we claim as new and desire to secure by Letters Patent of the United States is:

1. A liquid linear polysiloxane comprising from 80 to 99 mol per cent polymeric dimethylsiloxane containing up to 5 mol per cent monomethylsiloxane copolymerized therewith and from 1 to 20 mol per cent diphenylsiloxane copolymerized therewith, the said linear polysiloxane chain being terminated by two silicon atoms to each of which are attached three hydrocarbon radicals selected from the class consisting of alkyl and aryl radicals.

2. A liquid linear polysiloxane corresponding to the general formula

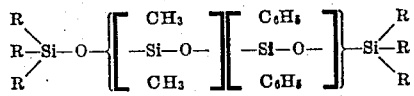

where R is a monovalent hydrocarbon radical selected from the class consisting of alkyl and aryl radicals, of the total diorganosiloxy units, the dimethylsiloxy units being present in an amount equal to from 80 to 99 mol per cent and the diphenylsiloxy units being present in an amount ranging from 1 to 20 mol per cent.

3. A lubricant consisting essentially of a mixture of liquid linear polysiloxanes comprising from 80 to 99 mol per cent polymeric disiloxane containing up to 5 mol per cent monomethylsiloxane copolymerized therewith and from 1 to 20 mol per cent diphenylsiloxane copolymerized therewith, the said linear polysiloxane chains each being terminated by two silicon atoms to each of which silicon atoms are attached three methyl groups.

MURRAY M. SPRUNG.
DONALD F. WILCOCK.

REFERENCES CITED

The following references are of record in the file of this patent:

UNITED STATES PATENTS

| Number | Name | Date |
|---|---|---|
| 2,386,441 | Daudt | Oct. 9, 1945 |
| 2,398,672 | Sauer | Apr. 16, 1946 |
| 2,410,346 | Hyde | Oct. 29, 1946 |
| 2,443,353 | Hyde | June 15, 1948 |
| 2,455,999 | Hyde | Dec. 14, 1948 |
| 2,457,677 | Hyde | Dec. 28, 1948 |